United States Patent
Ye et al.

(10) Patent No.: US 9,798,390 B2
(45) Date of Patent: Oct. 24, 2017

(54) ELECTRONIC DEVICE AND METHOD OF MOTION PROCESSING

(71) Applicant: CM HK LIMITED, Fortress Hill (HK)

(72) Inventors: Zhou Ye, Foster City, CA (US);
Chin-Lung Li, Taoyuan County (TW);
Shun-Nan Liou, Taipei (TW);
Chien-Chih Hsu, Taipei (TW)

(73) Assignee: CM HK LIMITED, Fortress Hill (HK)

( * ) Notice: Subject to any disclaimer, the term of this patent is extended or adjusted under 35 U.S.C. 154(b) by 0 days.

(21) Appl. No.: 13/945,930

(22) Filed: Jul. 19, 2013

(65) Prior Publication Data
US 2015/0025840 A1 Jan. 22, 2015

(51) Int. Cl.
*G06F 5/00* (2006.01)
*G06F 3/00* (2006.01)
*G06F 3/01* (2006.01)
*G06F 11/30* (2006.01)

(52) U.S. Cl.
CPC .......... *G06F 3/017* (2013.01); *G06F 11/3058* (2013.01); *G06F 11/3089* (2013.01); *G06F 11/3096* (2013.01)

(58) Field of Classification Search
None
See application file for complete search history.

(56) References Cited

U.S. PATENT DOCUMENTS

| 7,000,469 | B2 * | 2/2006 | Foxlin et al. | 73/488 |
| 7,128,270 | B2 * | 10/2006 | Silverbrook | G06F 3/03545 235/462.45 |
| 7,605,940 | B2 * | 10/2009 | Silverbrook | G06F 3/03545 348/294 |
| 8,000,789 | B2 * | 8/2011 | Denison | G01D 5/24 324/76.38 |
| 8,205,121 | B2 * | 6/2012 | Pomerantz | G06F 11/3466 709/232 |
| 2007/0113286 | A1 * | 5/2007 | Cromer | G06F 3/0616 726/26 |
| 2009/0184849 | A1 * | 7/2009 | Nasiri et al. | 341/20 |
| 2009/0265671 | A1 * | 10/2009 | Sachs et al. | 715/863 |
| 2011/0163955 | A1 * | 7/2011 | Nasiri et al. | 345/158 |
| 2012/0022844 | A1 * | 1/2012 | Teixeira | 703/11 |

(Continued)

OTHER PUBLICATIONS

Jia, Ning. "Fall Detection Application by Using 3-Axis Accelerometer ADXL345". Analog Devices. AN-1023 Application Note. Copyright 2009. Availabile: http://blog.ednchina.geo.eet-cn.com/uploadedn/Blog/2009/7/1/32909b38-5e12-4a32-bd7e-19e75256ed35.pdf.*

*Primary Examiner* — Michael Sun
(74) *Attorney, Agent, or Firm* — McClure, Qualey & Rodack, LLP

(57) ABSTRACT

An electronic device is provided. The electronic device includes a motion sensor and a processor. The motion sensor is configured to perform a sampling at a sampling rate. In each sampling, the motion sensor generates a sample by sampling an angular velocity or an acceleration of the electronic device. The motion sensor is further configured to store each sample in a buffer of the motion sensor. The processor is coupled to the motion sensor and is configured to perform a polling at a polling rate. In each polling, the processor fetches a plurality of the samples from the buffer. The processor is further configured to perform a numerical integration based on the fetched samples.

14 Claims, 3 Drawing Sheets

(56) References Cited

U.S. PATENT DOCUMENTS

2012/0277545 A1* 11/2012 Teixeira .................. 600/301
2013/0314238 A1* 11/2013 Li .................. G06F 1/1694
                                                                               340/669
2016/0266661 A1* 9/2016 Forsblom .............. G06F 3/0346

* cited by examiner

ELECTRONIC DEVICE AND METHOD OF MOTION PROCESSING

BACKGROUND OF THE INVENTION

Field of the Invention

The present invention relates to an electronic device and a method of motion processing. More particularly, the present invention relates to an electronic device and a method that handle the samples used in numerical integration for motion processing.

Description of the Related Art

Some modern consumer electronic devices, such as smart phones, can be used as remote controls for controlling home appliances, or be used as user interfaces for interacting with game consoles. Alternatively, some consumer electronic devices can execute applications or games responsive to movements and/or rotations of the electronic devices themselves. In such applications, the user can issue a command by moving or rotating such an electronic device. Such an electronic device includes a motion sensor to detect the movement and/or rotation of the electronic device itself. For example, the motion sensor may be a gyroscope that detects the angular velocity of the rotation of the electronic device. The central processing unit (CPU) of the electronic device can calculate the rotation or the orientation of the electronic device by performing a numerical integration based on the sampled angular velocities of the electronic device.

FIG. 1 is a schematic diagram showing the sampling and the numerical integration of a conventional motion processing of the aforementioned electronic device. The curve 110 represents the angular velocity of the electronic device. The motion sensor of the electronic device samples the angular velocity periodically. The samples are represented as round dots on the curve 110, such as the samples 112, 114 and 116. The area between the angular velocity curve 110 and the time axis means the amount of the rotation of the electronic device. The CPU of the electronic device uses the samples of the angular velocity to perform a numerical integration to get an approximation of the area, and then the CPU interprets the result as a command input by the user or a state of the electronic device, for further motion processing.

The CPU may perform the numerical integration by accumulating the areas of the trapezoids defined by the samples, such as the trapezoid 120 defined by the samples 112 and 114. Inevitably, there is an accumulated error between the real angular velocity curve and the trapezoids. For example, the shaded area 130 is a part of the accumulated error, which is between the real curve 110 and the trapezoid 120. The smaller the accumulated error, the more accurate the numerical integration.

The motion sensor samples the curve 110 according to its own clock. The CPU polls the motion sensor and fetches the samples from the motion sensor according to its own clock. The two clocks are often not in synchronization. The CPU uses the time of its own clock to calculate the numerical integration, regardless of the actual sampling time of the samples, which results in incorrect areas of the trapezoids and enlarges the accumulated error. Even when the two clocks are synchronized, sometimes the CPU is too engaged in other tasks to fetch the samples from the motion sensor at the right moments, which also contributes to the accumulated error.

One way to solve the synchronization problem is using interrupt to notify the CPU of new samples to be fetched. However, this solution requires the CPU to provide a dedicated pin for receiving the interrupt signal from the motion sensor, which is often impractical because the pins of the CPU are precious resources.

The CPU polls the motion sensor periodically. The CPU fetches one sample from the motion sensor in each polling. The motion sensor only keeps the latest sample. The polling rate of the CPU is often lower than the sampling rate of the motion sensor. For example, the motion sensor may sample the curve 110 every one millisecond (ms), while the CPU may poll the motion sensor every ten milliseconds. In this case, the CPU gets only one tenth of the samples produced by the motion sensor. Ideally, the polling rate for the CPU should be as high as possible because more samples means the upper envelope of the trapezoids can approach the curve 110 to reduce the accumulated error. However, the CPU has other tasks to do in addition to polling the motion sensor, such as executing applications and refreshing the display of the electronic device. The CPU can be too busy in communicating with the motion sensor to perform the other tasks when the polling rate for the CPU is too high.

SUMMARY OF THE INVENTION

Accordingly, the present invention is directed to an electronic device and a method of motion processing that can reduce the accumulated error in the numerical integration.

According to an embodiment of the present invention, an electronic device is provided. The electronic device includes a motion sensor and a processor. The motion sensor is configured to perform a sampling at a sampling rate. In each sampling, the motion sensor generates a sample by sampling an angular velocity or an acceleration of the electronic device. The motion sensor is further configured to store each sample in a buffer of the motion sensor. The processor is coupled to the motion sensor and is configured to perform a polling at a polling rate. In each polling, the processor fetches a plurality of the samples from the buffer. The processor is further configured to perform a numerical integration based on the fetched samples.

According to another embodiment of the present invention, a method of motion processing is provided. The method includes the following steps: performing a sampling at a sampling rate, wherein each sampling includes generating a sample by sampling an angular velocity or an acceleration of an electronic device; storing each sample in a buffer; performing a polling at a polling rate, wherein each polling includes fetching a plurality of the samples from the buffer; and performing a numerical integration based on the fetched samples.

According to another embodiment of the present invention, an electronic device is provided. The electronic device includes a motion sensor and a processor. The motion sensor is configured to perform a sampling to generate a sample at a sampling rate, wherein the motion sensor is further configured to store each sample in a buffer of the motion sensor. The processor is coupled to the motion sensor and is configured to perform a polling at a polling rate, wherein in each polling the processor fetches a plurality of the samples from the buffer.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
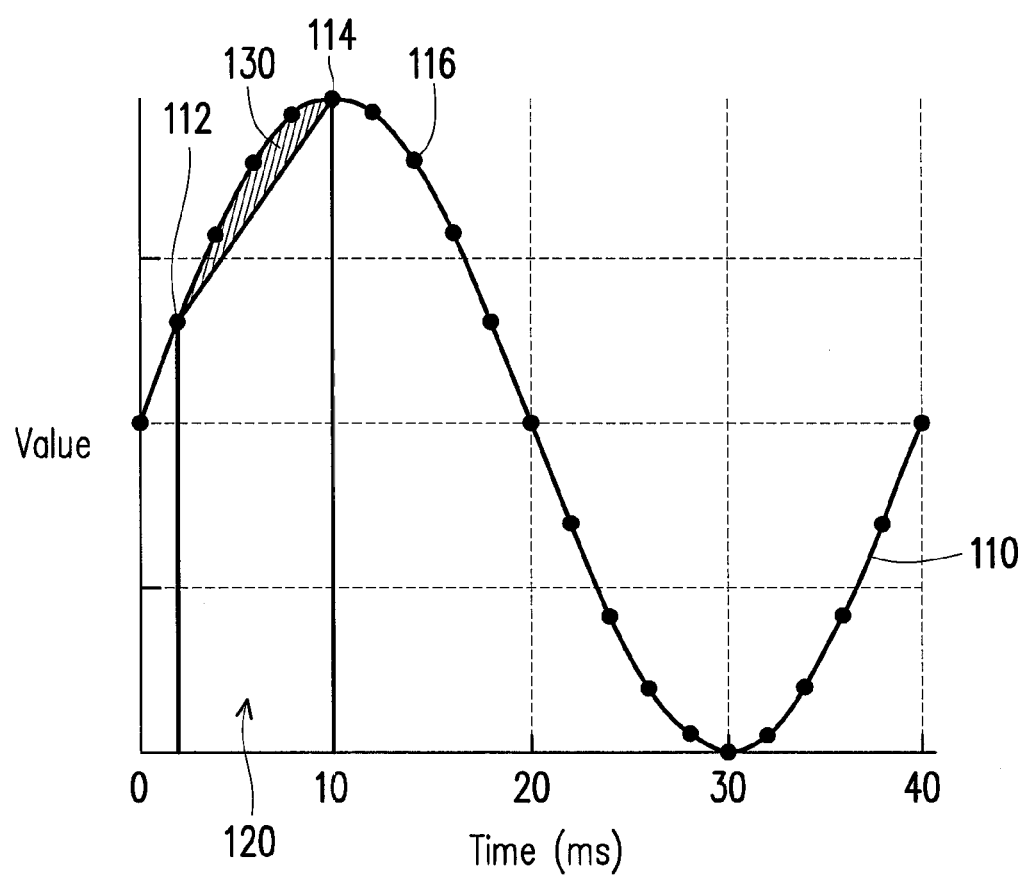
FIG. 1 is a schematic diagram showing the sampling and the numerical integration of a conventional motion processing.

Reference will now be made in detail to the present embodiments of the invention, examples of which are illustrated in the accompanying drawings. Wherever possible, the same reference numbers are used in the drawings and the description to refer to the same or like parts.

Figure 2:
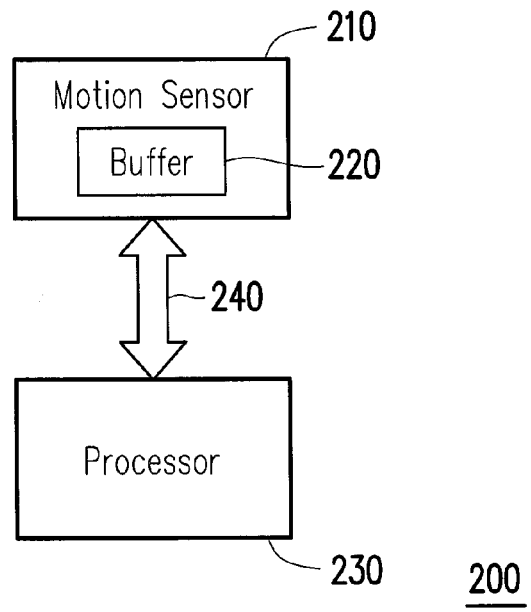
FIG. 2 is a schematic diagram showing an electronic device according to an embodiment of the present invention.

FIG. 2 is a schematic diagram showing an electronic device 200 according to an embodiment of the present invention. The electronic device 200 may be a smart phone, a personal digital assistant (PDA), a tablet computer, a remote control, or any other electronic device that can be moved and/or rotated. The electronic device 200 includes a motion sensor 210, a processor 230, and a bus 240. The motion sensor 210 includes a buffer 220. The processor 230 is coupled to the motion sensor 210 through the bus 240.

Please note that the motion sensor may be a gyro-sensor, an accelerometer, a 6-axis motion sensor or a 9-axis motion sensor. In an embodiment of the present invention, the motion sensor 210 may be a gyro-sensor that detects and samples the angular velocity of the electronic device 200. In another embodiment of the present invention, the motion sensor 210 may be an accelerometer that detects and samples the acceleration of the electronic device 200. In another embodiment of the present invention, the motion sensor 210 may be a 6-axis motion sensor that detects and samples the acceleration or the angular velocity of the electronic device 200. In another embodiment of the present invention, the motion sensor 210 may be a 9-axis motion sensor that detects and samples the acceleration, the angular velocity or the magnetism of the electronic device 200. Those skilled in the art can readily understand 6-axis motion sensor comprises a 3-axis gyroscope and a 3-axis accelerometer, and further description is omitted here for brevity. Similarly, the 9-axis motion sensor comprises a 3-axis gyroscope, a 3-axis accelerometer and a 3-axis compass, and further description is omitted here for brevity. The buffer 220 may be a first-in-first-out (FIFO) register that can store a plurality of samples produced by the motion sensor 210. The processor 230 may be the CPU, a microprocessor, or an embedded controller of the electronic device 200.

Figure 3:
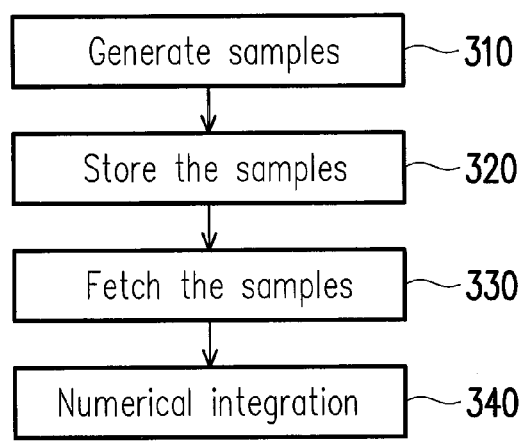
FIG. 3 is a flow chart showing a method of motion processing according to an embodiment of the present invention.

FIG. 3 is a flow chart showing a method of motion processing according to an embodiment of the present invention. The method shown in FIG. 3 may be executed by the electronic device 200. In step 310, the motion sensor 210 performs a sampling at a predetermined sampling rate. The processor 230 may set the sampling rate for the motion sensor 210 by accessing a configuration register of the motion sensor 210 before executing the method shown in FIG. 3. In each sampling, the motion sensor 210 generates a sample by sampling an angular velocity or an acceleration of the electronic device 200. In step 320, the motion sensor 210 stores each sample generated in step 310 in the buffer 220.

In step 330, the processor 230 polls the motion sensor 210 periodically at a predetermined polling rate. The sampling rate for the motion sensor 210 may be higher than or equal to the polling rate for the processor 230. Therefore, each time when the processor 230 polls the motion sensor 210, there may be already a plurality of samples stored in the buffer 220 so that the processor 230 may fetch more than one sample from the buffer 220. The processor 230 may fetch a part or all of the samples stored in the buffer 220 in each aforementioned polling. The processor 230 performs the polling and the fetching through the bus 240.

In step 340, the processor 230 performs a numerical integration based on the samples fetched in step 330. When the motion sensor 210 is a gyro-sensor, the samples may be angular velocities of the electronic device 200 and the result of the numerical integration may be an angle of the rotation or the orientation of the electronic device 200. When the motion sensor 210 is an accelerometer, the samples may be accelerations of the electronic device 200 and the result of the numerical integration may be a velocity or a distance of the translation of the electronic device 200. The processor 230 may use a part or all of the samples fetched in step 330 to perform the numerical integration. The more samples used, the smaller the accumulated error of the numerical integration.

Figure 4:
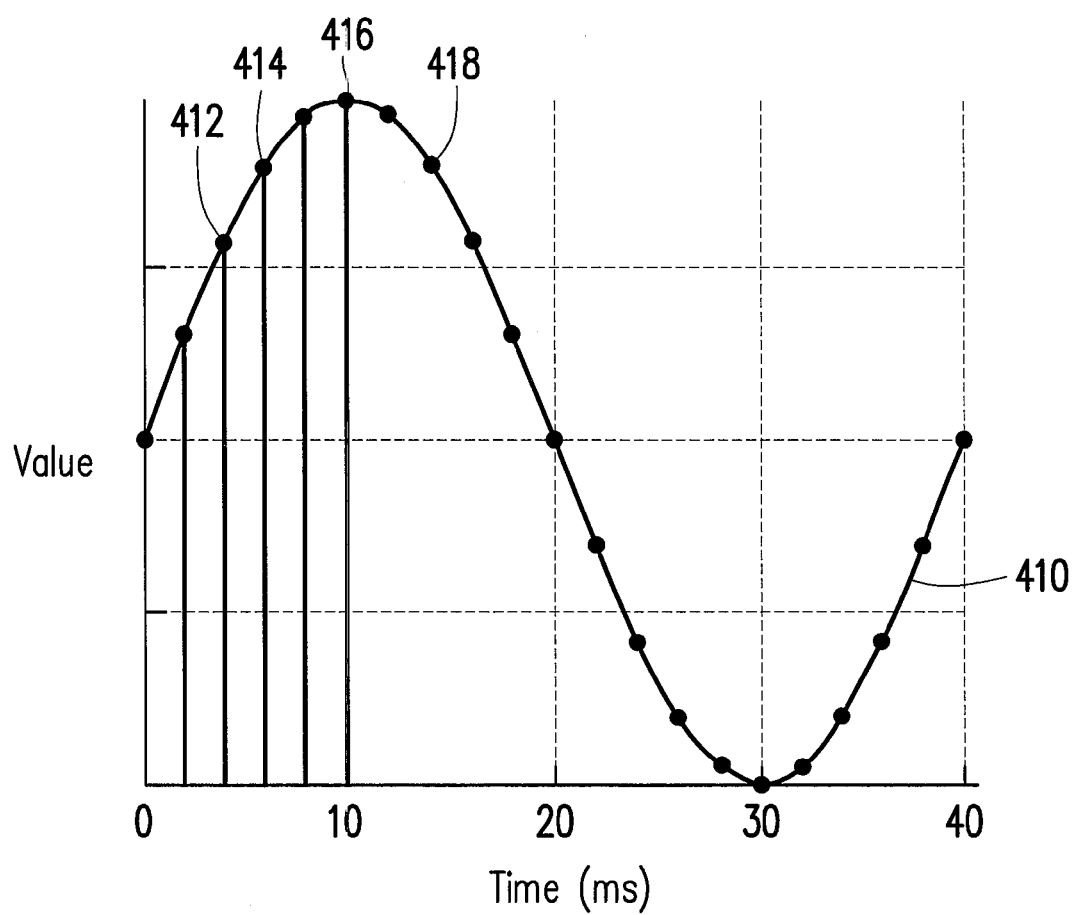
FIG. 4 is a schematic diagram showing the sampling of a motion processing according to an embodiment of the present invention.

FIG. 4 is a schematic diagram showing the sampling of a motion processing of the electronic device 200 according to an embodiment of the present invention. The curve 410 represents the angular velocity or the acceleration sampled by the motion sensor 210. The samples are represented by round dots on the curve 410, such as the samples 412, 414, 416 and 418.

In this embodiment, the sampling rate of the motion sensor 210 is 500 Hz and the polling rate of the processor 230 is 100 Hz. In other words, the motion sensor 210 produces a sample every two milliseconds, while the processor 230 polls the motion sensor 210 every ten milliseconds. At each polling, there are already five samples stored in the buffer 220 waiting for the processor 230. The processor 230 may fetch a part or all of the five samples stored in the buffer 220.

In this way, the processor 230 may set the sampling rate of the motion sensor 210 to be much higher than the polling rate of the processor 230 such that there are a lot of samples available to the processor 230 at each polling. The low polling rate can free the processor 230 from frequently accessing the bus 240 for the polling and the fetching so that the processor 230 has more time to process the other tasks of the electronic device 200. In addition, the high sampling rate of the motion sensor 210 means more samples and smaller accumulated error of the numerical integration.

In this embodiment, the processor 230 uses the sampling period corresponding to the sampling rate of the motion sensor 210 as the height (or width) of the trapezoids defined by the samples to perform the numerical integration in step 340. In other words, the processor 230 performs the numerical integration according to the clock of the motion sensor 210 instead of the clock of the processor 230 itself, which eliminates the accumulated error caused by two asynchronous clocks. The motion sensor 210 is dedicated to generating the samples according to its own clock. Unlike the processor 230, the motion sensor 210 has no other distracting tasks. Therefore, the sampling time of the motion sensor 210 is very accurate, which helps to reduce the accumulated error of the numerical integration.

In summary, the present invention can effectively reduce the accumulated error of the numerical integration in motion processing by more accurate sampling time and higher sampling rate. Moreover, the present invention does not require a dedicated pin of the processor because the processor does not need interrupt for fetching the samples.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
    a motion sensor, having sensor circuitry including a sensor clock, the motion sensor being configured to perform a sampling at a sampling rate according to the sensor clock, wherein in each said sampling the motion sensor generates a sample by sampling an angular velocity or an acceleration of the electronic device, wherein the motion sensor is further configured to store each said sample at the sampling rate in a buffer of the motion sensor, and the buffer is located inside the motion sensor; and
    a processor, having processor circuitry including a processor clock, the processor being coupled to the motion sensor and configured to perform a polling at a polling rate, wherein in each said polling the processor fetches only a part of the samples from the buffer, wherein the processor is further configured to perform a numerical integration based on the fetched samples according to the sensor clock;
    wherein the sampling rate is higher than the polling rate.

2. The electronic device of claim 1, wherein the processor sets the sampling rate for the motion sensor by accessing a configuration register of the motion sensor.

3. The electronic device of claim 1, wherein the processor uses a part of the fetched samples to perform the numerical integration.

4. The electronic device of claim 1, wherein the processor uses all of the fetched samples to perform the numerical integration.

5. The electronic device of claim 1, wherein the processor uses a sampling period corresponding to the sampling rate to perform the numerical integration.

6. The electronic device of claim 1, wherein the processor lacks a dedicated interrupt pin configured to facilitate fetching of the sample.

7. A method of motion processing, comprising:
    performing, by a motion sensor, a sampling at a sampling rate according to a sensor clock of the motion sensor, wherein each said sampling comprises generating a sample by sampling an angular velocity or an acceleration of an electronic device;
    storing each said sample at the sampling rate in a buffer of the motion sensor, and the buffer is located inside the motion sensor;
    performing a polling at a polling rate according to a processor clock, wherein each said polling comprises fetching only a part of the samples from the buffer; and
    performing a numerical integration based on the fetched samples according to the sensor clock to reduce accumulated error between the processor clock and the sensor clock;
    wherein the sampling rate is higher than the polling rate.

8. The method of claim 7, wherein the step of performing the numerical integration comprises:
    using a part of the fetched samples to perform the numerical integration.

9. The method of claim 7, wherein the step of performing the numerical integration comprises:
    using all of the fetched samples to perform the numerical integration.

10. The method of claim 7, wherein the step of performing the numerical integration comprises:
    using a sampling period corresponding to the sampling rate to perform the numerical integration.

11. An electronic device, comprising:
    a motion sensor, having sensor circuitry including a sensor clock, the motion sensor being configured to perform a sampling to generate a sample at a sampling rate according to the sensor clock, wherein the motion sensor is further configured to store each said sample at the sampling rate in a buffer of the motion sensor, and the buffer is located inside the motion sensor; and
    a processor, having processor circuitry including a processor clock, the processor being coupled to the motion sensor and configured to perform a polling at a polling rate, wherein in each said polling the processor fetches only a part of the samples from the buffer;
    wherein the sampling rate is higher than the polling rate; and
    wherein the processor is further configured to perform a numerical integration based on the fetched samples according to the sensor clock.

12. The electronic device of claim 11, wherein the motion sensor is a gyro-sensor, an accelerometer, a 6-axis motion sensor or a 9-axis motion sensor.

13. The electronic device of claim 11, wherein in each said sampling the motion sensor generates a sample by sampling an angular velocity or an acceleration of the electronic device.

14. The electronic device of claim 11, wherein the processor lacks a dedicated interrupt pin configured to facilitate fetching of the sample.

* * * * *